United States Patent
Huf et al.

(10) Patent No.: US 11,214,174 B2
(45) Date of Patent: Jan. 4, 2022

(54) VEHICLE SEAT CONSOLE

(71) Applicant: Bayerische Motoren Werke Aktiengesellschaft, Munich (DE)

(72) Inventors: Andreas Huf, Neusaess (DE); Klaus Hufnagl, Munich (DE); Sylvia Kleindl, Munich (DE); Fabian Koehler, Valley (DE); Robert Martin, Munich (DE); Robert Painer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/751,372

(22) Filed: Jan. 24, 2020

(65) Prior Publication Data
US 2020/0156508 A1    May 21, 2020

Related U.S. Application Data

(63) Continuation of application No. PCT/EP2018/070221, filed on Jul. 25, 2018.

(30) Foreign Application Priority Data

Jul. 26, 2017  (DE) ..................... 10 2017 212 792.9

(51) Int. Cl.
   *B60N 2/08*     (2006.01)
   *B60N 2/06*     (2006.01)
   (Continued)

(52) U.S. Cl.
   CPC .......... *B60N 2/067* (2013.01); *B60N 2/0232* (2013.01); *B60N 2/075* (2013.01); *B60N 2/0722* (2013.01)

(58) Field of Classification Search
   CPC ..... B60N 2/067; B60N 2/42709; F16H 25/24; F16H 2025/249
   See application file for complete search history.

(56) References Cited

U.S. PATENT DOCUMENTS 4,270,404 A * 6/1981 Murakoshi ............. F16H 25/02
                                                248/913
4,355,778 A    10/1982 Hess et al.
(Continued)

FOREIGN PATENT DOCUMENTS

CN        2423150 Y      3/2001
CN      101448674 A      6/2009
(Continued)

OTHER PUBLICATIONS

International Search Report (PCT/ISA/210) issued in PCT Application No. PCT/EP2018/070221 dated Oct. 17, 2018 with English translation (four (4) pages).
(Continued)

*Primary Examiner* — Amy J. Sterling
(74) *Attorney, Agent, or Firm* — Crowell & Moring LLP

(57) ABSTRACT

A vehicle seat console has at least one vehicle-side guide element and at least one seat-side guide element that is arranged parallel to the vehicle-side guide element. At least one longitudinal adjustment device that is acted upon by a drive device is designed to bring about a relative adjustment between the vehicle-side guide element and the seat-side guide element. The longitudinal adjustment device is provided with a toothed rack and a gearwheel that is in meshing engagement with the toothed rack. The teeth of the gearwheel and/or the teeth of at least one section of the toothed rack are made of materials of different shear strength.

11 Claims, 2 Drawing Sheets

(51) Int. Cl.
    *B60N 2/02*          (2006.01)
    *B60N 2/07*          (2006.01)
    *B60N 2/075*        (2006.01)

(56) References Cited

U.S. PATENT DOCUMENTS

| | | | |
|---|---|---|---|
| 9,827,879 B2* | 11/2017 | Fujita | B60N 2/0881 |
| 2007/0151158 A1* | 7/2007 | Fenelon | E05F 11/423 |
| | | | 49/349 |
| 2010/0013285 A1 | 1/2010 | Stanz et al. | |
| 2016/0096459 A1 | 4/2016 | Line et al. | |
| 2016/0114703 A1 | 4/2016 | Fujita et al. | |
| 2018/0105073 A1 | 4/2018 | Hoffmann et al. | |

FOREIGN PATENT DOCUMENTS

| | | |
|---|---|---|
| CN | 102155519 A | 8/2011 |
| DE | 10 2015 116 480 A1 | 4/2016 |
| WO | WO 2016/150790 A1 | 9/2016 |

OTHER PUBLICATIONS

German-language Written Opinion (PCT/ISA/237) issued in PCT Application No. PCT/EP2018/070221 dated Oct. 17, 2018 (six (6) pages).

German-language Search Report issued in counterpart German Application No. 102017212792.9 dated May 16, 2018 with partial English translation (12 pages).

Chinese-language Office Action issued in Chinese Application No. 201880048373.2 dated Aug. 30, 2021 with English translation (12 pages).

\* cited by examiner

VEHICLE SEAT CONSOLE

CROSS REFERENCE TO RELATED APPLICATIONS

This application is a continuation of PCT International Application No. PCT/EP2018/070221, filed Jul. 25, 2018, which claims priority under 35 U.S.C. § 119 from German Patent Application No. 10 2017 212 792.9, filed Jul. 26, 2017, the entire disclosures of which are herein expressly incorporated by reference.

BACKGROUND AND SUMMARY OF THE INVENTION

The invention relates to a vehicle seat console. The invention also relates to a vehicle seat having such a vehicle seat console and to a motor vehicle having at least one such vehicle seat.

Belt systems and airbags are motor-vehicle passenger-protection systems which have been recognized for decades. They reduce the loading to which the passengers in a vehicle are subjected, in the event of a vehicle collision, usually only when said passengers are in defined, upright sitting positions. However, particularly in the case of fully automated driving, lying positions are becoming more and more important, and therefore adequate protection for passengers in such lying positions also has to be ensured. However, in the event of a vehicle collision, the known passenger-protection systems cannot sufficiently reduce the loading to which the passengers are subjected when they are in a lying or semi-lying position. There is therefore a need for the passenger-protection systems to be further developed so that, in the event of a vehicle collision, the acceleration of a passenger's body, even when the passenger is in a lying or semi-lying position, is limited to a defined level.

It is the object of the present invention to provide a vehicle seat console of the generic type which is designed so that, in the event of a vehicle collision, it sufficiently limits the loading to which the body of a person sitting on the vehicle seat is subjected, even if this person is in a lying or semi-lying position.

A vehicle seat console having at least one vehicle-mounted guide element and at least one seat-mounted guide element, which is arranged parallel to the vehicle-mounted guide element, and at least one longitudinal-adjustment device, which is activated by a drive device and is configured to effect relative adjustment between the vehicle-mounted guide element and the seat-mounted guide element, wherein the longitudinal-adjustment device has a rack and a gearwheel, which is in meshing engagement with the rack, is distinguished, according to the invention, in that the teeth of the gearwheel and/or the teeth of at least one portion of the rack consist of materials with different levels of shear strength.

The longitudinal adjustment of the vehicle seat takes place, in a manner known per se, by way of an electrically driven, or drivable, gearwheel, which is mounted in a rotatable manner on the vehicle seat or on the upper rail and meshes with the teeth of the rack, and rolls on the rack, as a result of which the vehicle seat is adjusted in the longitudinal direction of the vehicle. This apparatus therefore mounts the vehicle seat in a movable manner relative to the vehicle structure. In the event of a collision, the vehicle seat occupied by the passenger, on account of its mass inertia, tries to carry on moving counter to the collision force acting on the vehicle structure. However, on account of its inherent self-arresting action, the gearwheel is not capable of allowing relative movement between the vehicle-structure-mounted lower rail and the seat-mounted upper rail.

The selection of material according to the invention for the teeth of the gearwheel, and at least some of the teeth of the rack, allows the teeth made of the material with the lower level of shear strength to fail, and relative movement between the upper rail and the lower rail, that is to say between the vehicle seat and the vehicle structure, can take place. The failing teeth therefore free an amount of displacement travel at a defined force level. This is therefore achieved via the combination of gearwheel and rack made of materials with different levels of shear strength.

By virtue of the provision of the teeth made of the material with the lower level of shear strength in the pairing between the gearwheel and rack, the core of the invention is therefore that of specifically forming a weak-point region in which—in a manner similar to a predetermined breaking point—desired material failure occurs, that is to say a material-failure region is created, in the event of overloading. The collision acceleration which acts on the vehicle structure in the event of a vehicle collision gives rise, in the vehicle seat, to an oppositely directed acceleration, which in turn generates a force which acts on the tooth flanks in the pairing between the gearwheel and rack and is dependent on the magnitude of said acceleration and on the mass of the vehicle seat with the person sitting on it. If this force exceeds a threshold value for the force-supporting capability of the pairing between the gearwheel and rack, said threshold value being predetermined by the shear strength of the material, then the material fails in the material-failure region and the vehicle seat can move relative to the vehicle structure. Kinetic energy here is converted into deformation (of the teeth) and is therefore dissipated; the vehicle seat therefore continues to move in braked fashion. This dissipates collision-induced acceleration peaks for the person sitting on the vehicle seat.

For this purpose, the teeth of the gearwheel are formed, for example, from harder material, with a greater level of shear strength, than the teeth of at least one region of the rack, and therefore, in the event of a vehicle collision, the teeth of the gearwheel shear off the teeth in said region of the rack and thus give rise to defined limitation of the collision force acting on the vehicle seat. The force-limitation action is triggered by the forces which act by way of the passenger, belt system and seat in the event of a collision. The vehicle seat console according to the invention provides for better passenger-protection levels in the event of a collision, in particular for passengers in lying positions, than a vehicle seat console without force-limitation action.

It is preferably the case that the respective rack is vehicle-mounted, and the associated gearwheel is mounted in a rotatable manner on the seat-mounted guide element or on the vehicle seat.

In an advantageous embodiment, the materials with different levels of shear strength have a metal, on the one hand, and a plastic material or a relatively soft metal, such as, for example, aluminum or copper, on the other hand.

It is preferably the case here that the gearwheel has metal teeth, and at least one region of the rack has teeth made of a plastic material or of a relatively soft metal, such as, for example, aluminum or copper, of which the level of shear strength is lower than that of the metal teeth of the gearwheel.

It is also advantageous if the toothing formation between the gearwheel and the rack is a double helical toothing formation.

The double helical toothing formation of the gearwheel here is preferably an open double helical toothing formation.

In one embodiment, which can be combined with other embodiments, the double helical toothing formation of the rack is a closed double helical toothing formation.

The invention also relates to a vehicle seat having a vehicle seat console according to the invention.

In addition, the invention is directed to a motor vehicle having at least one vehicle seat according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
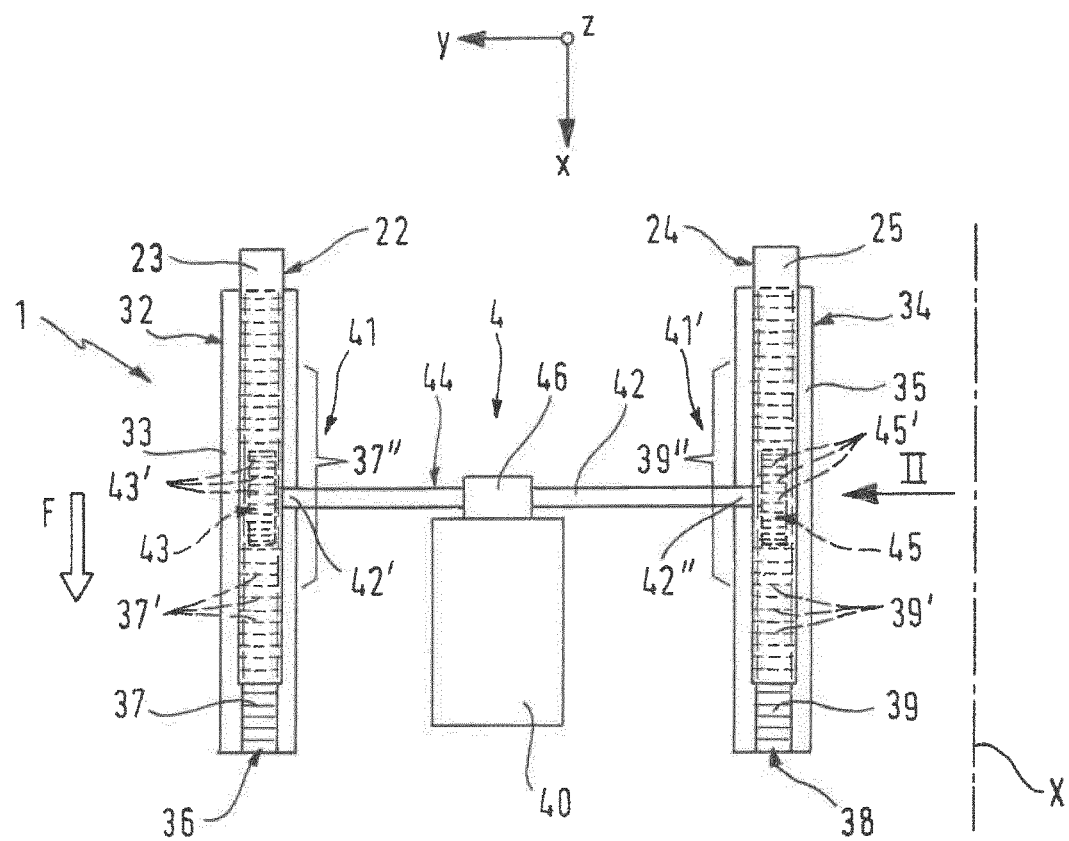
FIG. 1 is a schematic plan view of a seat console according to an embodiment of the invention.
Figure 2:
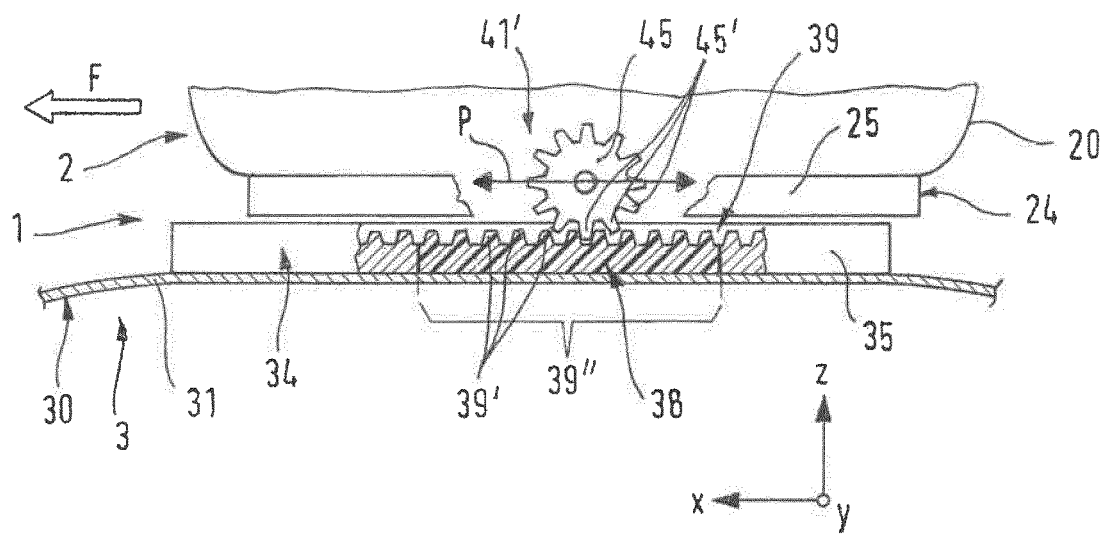
FIG. 2 is a detail-type side view of the seat console as seen in the direction of the arrow II in FIG. 1.

FIG. 1 shows a schematic plan view of a vehicle seat console. The vehicle seat console 1 connects a vehicle seat 2 (FIG. 2) to the chassis 30 of a vehicle 3. For this purpose, the vehicle seat console 1 has guide elements 32, 34 oriented in the longitudinal direction x of the vehicle, specifically a respective right-hand, lower guide rail 33, which is fixed to the vehicle floor 31, and a left-hand, lower guide rail 35, which is likewise fixed to the vehicle floor 31. These lower guide rails 33, 35 are parallel to the longitudinal axis X of the vehicle. Upper guide rails 23, 25, which are fitted on the vehicle seat 2, are in customary sliding engagement with said lower guide rails 33, 35. These upper guide rails 23, 25 form seat-mounted guide elements 22, 24. A sliding surface, which is not specifically described or shown in each case in the figures, but is advantageously provided, or coated, with a lubricant, is formed between the lower guide rails 33, 35 and the upper guide rails 23, 25. Instead of a sliding surface, it is also possible to provide a rolling-contact bearing, for example a ball bearing.

The right-hand, lower guide rail 33 and the left-hand, lower guide rail 35 have fitted within or alongside them a respective rack 36, 38, the latter being vehicle-mounted and extending essentially over the length of the respective lower guide rails 33, 35. In the example shown here, the toothing formation 37, 39 of the respective rack 36, 38 is directed upward, and therefore the teeth are oriented in the direction of the vehicle seat 2.

A seat-adjustment mechanism 4 is arranged on the vehicle seat 2, on the underside of the seat base 20. The seat-adjustment mechanism 4 has a drive device 40, for example an electric motor, which is coupled to a drive shaft 42, which extends in the transverse direction y of the vehicle, and provides the drive shaft with drive power. At the respective left-hand and right-hand end of the drive shaft 42, a respective gearwheel (pinion) 43, 45 is connected in a rotationally fixed manner to the drive shaft 42, wherein the respective gearwheel 43, 45 is arranged such that it is located above the respective rack 36, 38 of the respectively associated vehicle-mounted guide element 32, 34 and meshes with the respective toothing formation 37, 39. Rotation of the drive shaft 42, activated by the drive device 40, gives rise to rotation of the gearwheel 43, 45, which is fitted at the respective end of the drive shaft 42 and then, on account of meshing with the respectively associated rack 36, 38, moves forward in the direction of travel F, or rearward in the opposite direction, and carries along the vehicle seat 2 in said direction, as is symbolized by the double arrow P in FIG. 2. In this way, the lower guide rails 33, 35, the upper guide rails 23, 25, the racks 36, 38 and the gearwheels 43, 45 form a respective longitudinal-adjustment device 41, 41' for the vehicle seat 2. The respective longitudinal-adjustment device 41, 41' here forms a non-self-arresting translatory movement unit.

The drive shaft 42 forms a transmission device 44, by means of which the torque applied by the drive device 40 is transmitted to the respective longitudinal-adjustment device 41, 41'.

So that the vehicle seat 2 cannot normally be inadvertently displaced under the application of moderate external forces, a self-arresting movement unit 46 is provided between the drive device 40 and the drive shaft 42, said movement unit having, for example, a worm-shaft drive. As an alternative, or in addition, it is also possible to provide a locking device.

The teeth 43', 45' of the respective gearwheel 43, 45 and the teeth 37', 39' of at least one safety portion 37'', 39'' of the toothing formation 37, 39 of the respective rack 36, 38 consist of material with different levels of shear strength. For example, the respective gearwheel 43, 45 has metal teeth, and the safety portion 37'', 39'' of the toothing formation 37, 39 of the respective rack 36, 38 has teeth 37', 39' made of a plastic material or some other relatively soft material, for example aluminum or copper, of which the level of shear strength is lower than that of the metal teeth of the respective gearwheel 43, 45.

In the event of the vehicle 3 colliding relatively severely with an obstruction or another vehicle such that the collision force has a significant component in the longitudinal direction x of the vehicle, the vehicle 3 is accelerated positively (rear-end impact) or negatively (frontal impact) by the sudden collision force. In the case of this acceleration, the vehicle seat 2 with the person sitting on it, on account of the inertial mass of this person and of the vehicle seat 2, tries first of all to maintain the original speed, whereas the vehicle 3 undergoes the change in speed triggered by the collision-induced acceleration. As a result, the vehicle-mounted guide elements 32, 34, which are fixed to the vehicle chassis 30, and the seat-mounted guide elements 22, 24, which are fixed to the vehicle seat 2, on account of the collision-induced relative forces, try to move relative to one another, but are prevented from doing so by the self-arresting gearwheels 43, 45, possibly with additional locking being provided, which engage with the associated rack 36, 38. These relative forces are supported via the flanks of the interengaging teeth 43', 45', 37', 39' of the gearwheels 43, 45 and of the safety portion 37'', 39'' of the toothing formation 37, 39 of the associated rack 36, 38. If the collision-induced relative forces reach an intensity which can no longer be supported by the relatively weak teeth 37', 39' of the safety portion 37'', 39'' of the toothing formation 37, 39 of the respective rack 36, 38, then these relatively weak teeth 37', 39' shear off and the vehicle seat 2 can continue moving relative to the vehicle chassis 30—with braking provided by the shearing-off operation. The collision acceleration caused by the collision pulse is consequently attenuated by the shearing-off action of the teeth 37', 39' and therefore the level of acceleration acting on the vehicle seat 2 and the person sitting on it is lower than the collision acceleration. Some of the kinetic energy of the vehicle seat 2 with the person sitting on it is therefore transferred into free surfaces (fracture faces of the teeth 37', 39').

Figure 3:
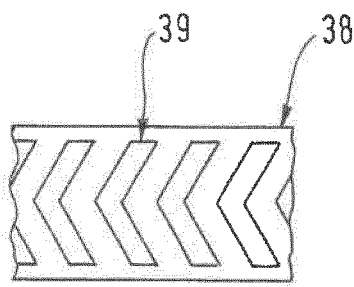
FIG. 3 is a schematic illustration of an open double helical toothing formation of the rack.
Figure 4:
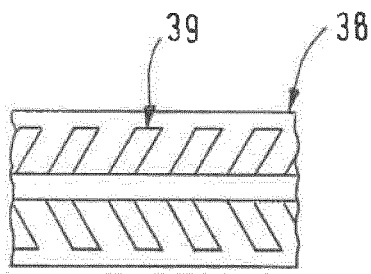
FIG. 4 is a schematic illustration of a closed double helical toothing formation of the rack.

It is possible for the toothing formation 37, 39 of the respective rack 36, 38 to be designed not just in the form of a rectilinear toothing formation, as is shown in FIG. 1, but also, as an alternative, in the form of a closed double helical toothing formation, as shown in FIG. 3, or in the form of an open double helical toothing formation, as shown in FIG. 4. Accordingly, the respectively associated gearwheel 43, 45 is also provided with the same toothing formation. It is also possible here for an open and a closed double helical toothing formation between the gearwheel and rack to be combined with one another.

The invention is not restricted to the exemplary embodiment above, which serves merely to give a general explanation of the core concept of the invention. Rather, in line with the scope of protection, the apparatus according to the invention can also take on configurations other than those described above. In particular, the apparatus here can have features which constitute a combination of the respective individual features of the claims.

Reference signs in the claims, the description and the drawings serve merely to give a better understanding of the invention and should not limit the scope of protection.

LIST OF REFERENCE SIGNS

1 Vehicle seat console
2 Vehicle seat
3 Vehicle
22 Seat-mounted guide element
23 Upper guide rail
24 Seat-mounted guide element
25 Upper guide rail
30 Chassis
31 Vehicle floor
32 Vehicle-mounted guide element
33 Lower guide rail
34 Vehicle-mounted guide element
35 Lower guide rail
36 Rack
37 Toothing formation
37' Teeth
37" Safety portion
38 Rack
39 Toothing formation
39' Teeth
39" Safety portion
40 Drive device
41 Longitudinal-adjustment device
41' Longitudinal-adjustment device
42 Drive shaft
42' Outer portion
42" Outer portion
43 Gearwheel (pinion)
43' Teeth
44 Transmission device
45 Gearwheel (pinion)
45' Teeth
46 Self-arresting movement unit
P Double arrow The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat console, comprising:
   at least one vehicle-mounted guide element and at least one seat-mounted guide element, which is arranged parallel to the vehicle-mounted guide element,
   at least one longitudinal-adjustment device, which is activated by a drive device and is configured to effect relative adjustment between the vehicle-mounted guide element and the seat-mounted guide element, wherein
   the longitudinal-adjustment device has a rack and a gearwheel, which is in meshing engagement with the rack, and
   teeth of the gearwheel or teeth of at least one portion of the rack are made of materials with different levels of shear strength, such that a weak-point region is formed between the gearwheel and the rack, in which a material failure occurs in the event of overloading.

2. The vehicle seat console according to claim 1, wherein the rack is vehicle-mounted, and
   the gearwheel is mounted in a rotatable manner on the seat-mounted guide element or on the vehicle seat.

3. The vehicle seat console according to claim 1, wherein the materials with different levels of shear strength have a metal, and a plastic material or a soft material.

4. The vehicle seat console according to claim 3, wherein the soft material is aluminum or copper.

5. The vehicle seat console according to claim 3, wherein the gearwheel has metal teeth, and
   at least one region of the rack has teeth made of a plastic material or of the soft material, of which the level of shear strength is lower than that of the metal teeth of the gearwheel.

6. The vehicle seat console according to claim 1, wherein the toothing formation between the gearwheel and the rack is a double helical toothing formation.

7. The vehicle seat console according to claim 6, wherein the double helical toothing formation of the gearwheel is an open double helical toothing formation.

8. The vehicle seat console according to claim 6, wherein the double helical toothing formation of the rack is a closed double helical toothing formation.

9. A vehicle seat comprising:
   a vehicle seat console having:
     at least one vehicle-mounted guide element and at least one seat-mounted guide element, which is arranged parallel to the vehicle-mounted guide element,
     at least one longitudinal-adjustment device, which is activated by a drive device and is configured to effect relative adjustment between the vehicle-mounted guide element and the seat-mounted guide element, wherein
     the longitudinal-adjustment device has a rack and a gearwheel, which is in meshing engagement with the rack, and
     teeth of the gearwheel or teeth of at least one portion od the rack are made of material with different levels of shear strength, such that a weak-point region is formed between the gearwheel and the rack, in which a material failure occurs in the event of overloading.

10. A motor vehicle comprising:
    a vehicle seat console having:

at least one vehicle-mounted guide element and at least one seat-mounted guide element, which is arranged parallel to the vehicle-mounted guide element, at least one longitudinal-adjustment device, which is activated by a drive device and is configured to effect relative adjustment between the vehicle-mounted guide element and the seat-mounted guide element, wherein the longitudinal-adjustment device has a rack and a gearwheel, which is in meshing engagement with the rack, and teeth of the gearwheel or teeth of at least one portion of the rack are made of materials with different levels of shear strength, such that a weak-point region is formed between the gearwheel and rack, in which a material failure occurs in the event of overloading.

11. A vehicle seat console, comprising:

at least one vehicle-mounted guide element and at least one seat-mounted guide element, which is arranged parallel to the vehicle-mounted guide element, at least one longitudinal-adjustment device, which is activated by a drive device and is configured to effect relative adjustment between the vehicle-mounted guide element and the seat-mounted guide element, wherein the longitudinal-adjustment device has a rack and a gearwheel, which is in meshing engagement with the rack, and the area of meshing engagement is an interior failure region wherein the region fails due to the gearwheel and rack having different maximum shear strengths.

* * * * *